June 27, 1967  G. G. WADDELL  3,327,396
EXTENSOMETER

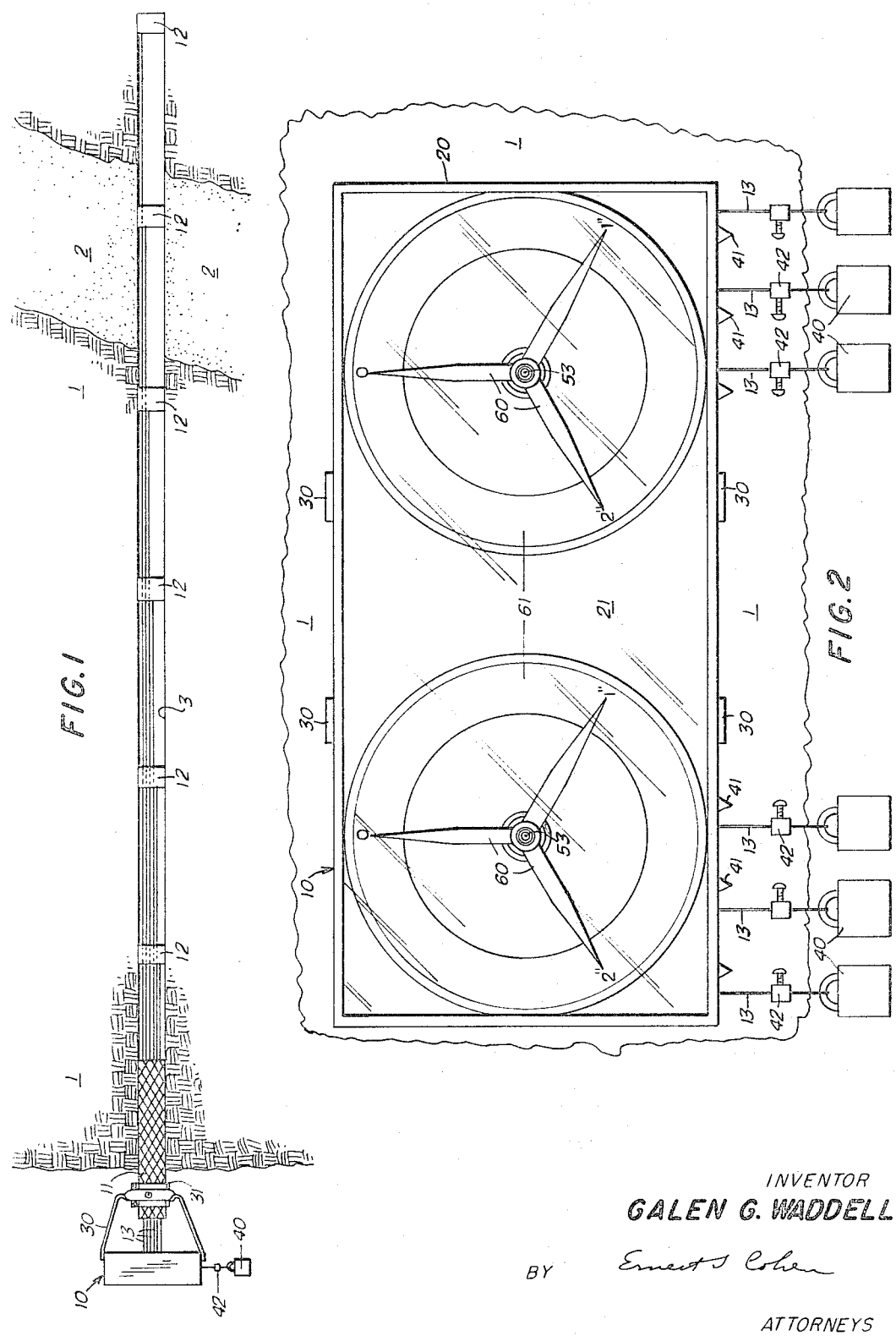

Filed March 10, 1965  2 Sheets-Sheet 2

INVENTOR
GALEN G. WADDELL

BY Ernest S Cohen

ATTORNEYS

United States Patent Office 3,327,396
Patented June 27, 1967

3,327,396
EXTENSOMETER
Galen G. Waddell, Spokane, Wash., assignor to the United States of America as represented by the Secretary of the Interior
Filed Mar. 10, 1965, Ser. No. 438,796
3 Claims. (Cl. 33—125)

The invention herein described and claimed may be manufactured and used by or for the Government of the United States of America for governmental purposes without the payment of royalties thereon or therefor.

This invention relates to a system for measuring ground movement between points along a borehole, and is particularly directed toward novel methods and apparatus for measuring longitudinal displacement in rock strata along the axis of a borehole.

It is desirable to determine differential movement between points within a rock wall (termed intradosal rock) in order to analyze structures, such as mine passages or tunnels, for calculating stress distribution. Deformation analysis is also used in the construction industries.

The novel borehole extensometer, or down-the-hole meter, of the present invention has wide application in the study of geological formations, especially where the movements to be studied occur at locations deep within the formation. There are many extensometers and other instruments to measure displacement in conjunction with cross-sections of shafts and tunnels, and some to measure longitudinal or axial deformations in openings. However, no known instrument has successfully measured displacement within rock to a depth of greater than twenty feet.

Prior to the instant invention, movement at shallow depths has been measured with devices such as anchored rods. Where multiple readings were desired in order to determine differential movement between strata, an individual hole had to be drilled for each reading. The economic disadvantages of multiple boreholes are sufficient to discourage much needed testing in this field of geological studies.

Prior art attempts to measure rock movements are summarized by E. de St. Q. Isaacson in Rock Pressure in Mines, Salisbury House, London, 1958, pages 164–193. An extensometer for measuring sag in a mine roof was described in U.S. Patent 3,092,912; however, the prior art workers have not been able to measure multiple displacements deep in intradosal rock.

Briefly, the present invention comprises a system for measuring intradosal geological deformations by drilling a borehole into the earth formation at the desired location for testing and inserting therein at least one and up to six or more anchor means adhering to the borehole sidewalls at different predetermined depths along the hole axis. By attaching metal wires to each borehole anchor and extending the wires to the outside surface of the hole, movement within the intradosal formation may be indicated at the surface.

The advantages of the down-the-hole meter are such as to make more economical the study of movements in earth formations in the vicinity of various excavations, such as mine stopes, and shafts, as well as movements associated with blasting and rockbursts. A single drill hole may be used for measuring movement at a number of points at varying distances from the surface. Furthermore, this extensometer may be used in conjunction with vertical drill holes, horizontal drill holes, or those inclined between the two. Although the down-the-hole meter is most useful at points far below the surface hundreds of feet, it may be used at relatively shallow locations.

Accordingly, it is an object of this invention to provide a novel system for measuring intradosal rock movement and other geological phenomena.

Further, it is an object of the present invention to provide methods and apparatus for measuring and indicating displacements between strata along a borehole or other excavation.

A specific object is to provide means for disposing one or more anchors along spaced intervals in a drill hole with motion-transmitting wires attached to the anchors and a meter assembly located at the surface of the drill hole with means for indicating movement at the anchor points.

These and other objects and features of the present invention will be apparent from the following descriptions thereof wherein reference is made to the figures of the accompanying drawings:

In the drawings:

FIG. 1 is a schematic view of a typical extensometer installation for measuring intradosal rock movement.

FIG. 2 is a front view of the meter assembly with the cover in place.

Figure 3:
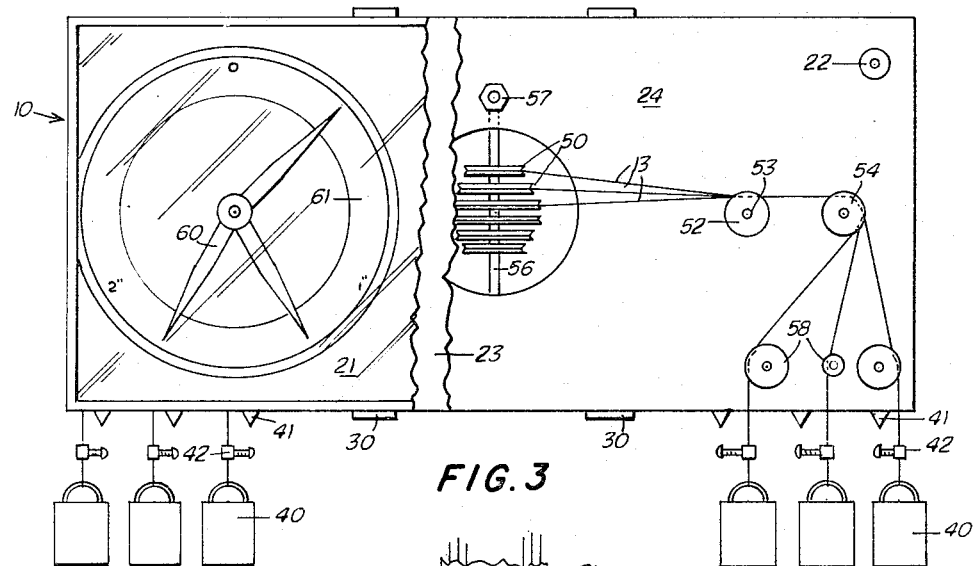
FIG. 3 is a partially cut-away front view of the meter assembly showing the indicator face and pointers.

FIG. 1 shows a horizontal installation of the down-the-hole meter in which a geological formation, such as rock-wall 1, having a vein 2 therein, is drilled to the desired depth to form a borehole 3. At the surface of the borehole a meter assembly 10 is mounted securely by a hollow standpipe 11. At spaced intervals along the axis of the borehole several anchors 12 may be secured to the sides of the hole by any of the methods known to those skilled in the art. Connected to each of these anchors is a respective one of a plurality of thin metal wires 13 which extend toward the surface through other anchored points in such manner as not to fetter the movement of the individual motion-transmitting function of the wires. These wires are held under substantially constant tension, as will be shown later, in order to accurately transmit the slightest movement of the anchored points to the meter at the surface of the borehole. Typically, movement of a stratum within the formation, for instance the vein, would be indicated at the surface of the borehole by noting the postiions of those anchors 12 located in the vein and alongside the vein.

Installation of the borehole anchors 12 may be accomplished using a variety of methods. In one such method a length of wire is attached to an anchoring device known to the art as a rockbolt expansion shell and inserted into the drill hole to a desired depth for measurement. As in U.S. Patent No. 2,661,649, a standard rockbolt expansion shell has an outer beveled shell and a center wedge with a threaded hole in the center. A long, threaded ½ inch threaded pipe is used to tighten the anchors in the borehole by a twisting action, whereby the threaded pipe screws into the threaded wedge, pulling the wedge against the shell and forcing the shell out against the side walls of the hole. Normally, the wires are attached to the anchor as by welding, tying or bolting, prior to insertion in the hole. When further wires and anchors are to be inserted, the wires from the previously-installed anchors are passed through the hollow portion of the anchor and threaded through the tightening pipe, which is later removed. Therefore, the arrangement described allows a number of wires to be extended toward the outer portions of the geological formation through the same hole. For larger holes, up to three inches in diameter, the anchor consists of a 1-inch O.D. tube eight inches in length and having four six-inch slices along its length to form four straps, and a 45 degree beveled wedge with a threaded center hole. For this anchor a threaded pipe with a raised collar that screws into the wedge may be used to tighten the anchor in place. For the rockbolt expansion shell type anchor, a suitable tightening pipe may be constructed of coupled aluminum tubing. The tedious process of threading the wires through the pipe may be eliminated by using split or spiral-slot tubing.

Another suitable anchor for use in the borehole is an explosive anchor which is molded to the contour of the drill hole, similar to that described in U.S. Patent 3,148,577.

Stainless steel wire is the preferred motion-transmitting means 13 for the present invention. Tests have shown that this wire is suitable for small diameters on the order of 0.02 inch and having a test strength of about 86 pounds. By tensioning these wires at a pull of about 8–12 pounds it was found that a high degree of accuracy in measurement was possible. Other materials such as Invar may be used to decrease the thermal variations; however, for use in mining operations the extensometer need not generally be temperature-compensated. This is not usually a problem in drill holes collared underground, but it may become a problem in areas where water circulates around the wires in holes near the surface of the formation. It has been found that if air is prevented from circulating in the drill hole, that there is no significant change in the wire length due to thermal changes. The tension applied to the wire should remain substantially constant throughout the testing period for the extensometer in order to insure that the accuracy of the instrument is maintained. It is recommended that stainless steel wires having diameters of about 0.018–.02 inch should not be tensioned in excess of 12 pounds in order to avoid creep in the wire material. Tensioning may be accomplished by weights or springs associated with the meter assembly, as will be later described in detail. It is necessary to maintain the wires under tension only during the testing periods. However, it is recommended that constant pull be maintained in order to avoid calibration problems.

The borehole standpipe 11 shown in FIG. 1 is a hollow member adapted for supporting the meter assembly and provides a passageway for the wires 13 extending from the anchors. Normally the standpipe will be cemented in place at the surface of the borehole. An alternative support made by mounting the meter housing on two rockbolts secured at a desired depth from the rock surface could also be used for the meter assembly mounting means. The particular support used will depend on the location and environment of the testing site and also will depend on the inclination of the drilled hole.

Figure 4:
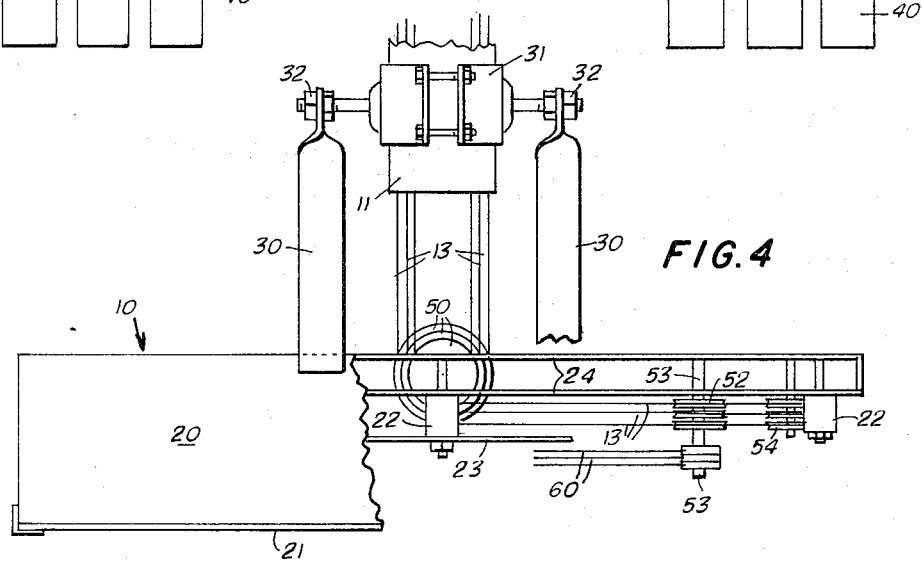
FIG. 4 is a top view of the extensometer meter assembly, partially cut-away to show its construction.
Figure 5:
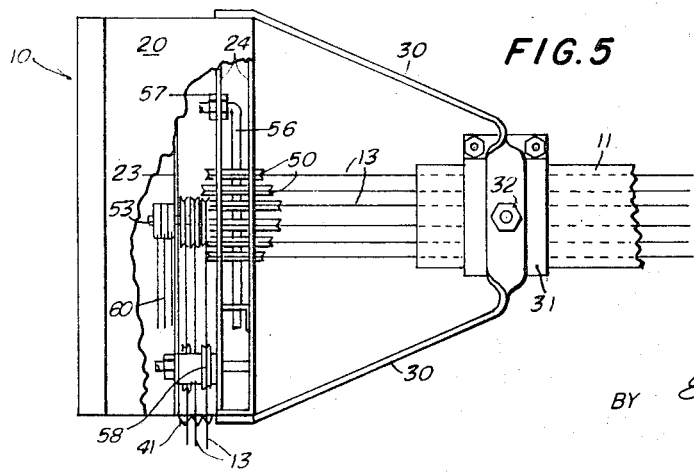
FIG. 5 is a side view of the meter assembly, also partially cut away.

The meter assembly 10, as shown in FIGS. 2, 3, 4 and 5, is a preferred embodiment of the invention and is intended as an example of the invention only. The meter housing 20 is supported on the standpipe 11 by a collar clamp assembly 30, having an annular ring 31 and a hole inclination adjustment 32. The meter housing may be constructed of any suitable material, such as sheet steel or aluminum. A transparent cover, such as clear plastic, may be used for the face of the instrument. Spacer elements 22 are used to separate and to support plates 23 and 24 inside the housing.

The motion-transmitting wires 13 are fed through the standpipe and collar clamp assembly to a series of centering pulleys 50. As may be seen from the drawings, a six point measuring system is illustrated, i.e., measurements are taken from six locations in the borehole. However, the number of points may vary according to the needs of the individual test. The six points are indicated on two dial faces, each dial face having three pointers each. This is used only as an illustration of the preferred embodiment of the invention, and ordinary mechanical skill may be used to devise any number of display devices within the concept of the present invention.

Centering pulleys 50 may be arranged with diameters of varying sizes to facilitate passage of the motion-transmitting wires to the pointer pulleys 52. The centering pulleys are mounted on an adjustable rod 56 which may be moved to compensate for borehole inclination, as much as 10 degrees from the horizontal, through the adjustment of the rod by nuts 57.

Indication of the intradosal movement is made by pointers 60, which are concentrically mounted. The wires are wrapped around the pulleys 52 one turn, 360 degrees, and then pass to idler pulleys 54 and 58, which serve to position the wires to accommodate the tensioning weights 40. The concentric pointer assembly is supported by a stainless steel shaft 53 and readout of the measurement is made on pointer scale 61. The moving parts of the assembly may be constructed of any suitable structural material such as brass; however, centering pulleys 50 and idler pulleys 54 should have a roller type bearing.

Calibration and check measurements for the meter assembly may be made using inside micrometer readings between points 41 on the meter housing and adjustable markers 42 on the extensometer wires. These readings serve as a check against tampering, pointer slippage, and may even be used as the sole means of indication for the instrument.

In adapting the meter assembly to more vertical drill holes, the use of pulleys mounted on a rod or axle through the end of the standpipe will align the wires on the centering pulleys. Also, the use of coil springs instead of weights for tensioning the extensometer wires will facilitate adapting the meter assembly for vertically inclined boreholes.

Use of the system to obtain unit strain change between any two anchor points can be made by dividing the change in distance between points by the total distance between anchors, as known from the depth of insertion at the time of installation. The extensometer of the present invention has been used for measuring strata displacements on the order of 0.0001 to .001 up to several inches. The scale calibration for the pointer dial in one embodiment was 0–3 inches with fine readings on the order of thousandths of an inch discernible. Although the system may be used for measuring shallow movements in a multiple-point study, its primary usefulness is in the deeper intradosal rock lying 20 to 300 feet from the access surface of the drill hole.

The down-the-hole meter may be modified to provide a continuous chart recorder, which would have the advantage of giving readings during periods of peak movement during rockbursts which readings might be missed with an interval-recording system. Also electrical read-out devices such as variable differential transformer or strain gage transducers may be attached to the extensometer wires.

Numerous other variations and modifications may obviously be made without departing from the invention. Accordingly, it should be clearly understood that those forms of the invention described above and chosen for purposes of illustration in the drawings are illustrative only and are not intended to limit the scope of the invention.

What is claimed is:

1. An extensometer for measuring longitudinal displacement of earth strata at spaced intervals along an elongated borehole comprising: a meter assembly mounted on a surface of a geological formation containing the borehole, a plurality of hollow borehole anchors disposed at predetermined spaced intervals along said borehole and securely mounted on side walls of said borehole, earth strata displacement sensor wires connected to each of said anchors and passing through hollow portions of said anchors towards said meter assembly, a plurality of separately rotatable means operatively mounted in said meter assembly so that each said rotatable means is substantially aligned with a respective one of said wires, a further plurality of separately rotatable means operatively mounted in said meter assembly, a plurality of indicators having connections thereto respectively joining each to a separate one of said further plurality of rotatable means for displacements therewith, said respective wires extending through said meter assembly wherein they are separately supported on said rotatable means aligned therewith, and tensioned into driving contact with said further plurality of rotatable means, whereby movement of earth strata along said borehole is transmitted to said meter assembly and indicated by said indicators.

2. The extensometer of claim 1, further comprising wire stressing means, and an arrangement of rotatable bearing means mounted in said meter assembly, said wires extending from said further plurality of rotatable means being held in contact with said bearing means by having the extended ends thereof connected to said stressing means whereby said wires are maintained under tension.

3. The extensometer of claim 1 wherein said aligned rotatable means are pulleys, and further comprising a shaft on which said pulleys are arranged to rotate, and means adjustably supporting said shaft in said meter assembly.

References Cited
UNITED STATES PATENTS

| | | | |
|---|---|---|---|
| 2,445,340 | 7/1948 | Thomas | 33—125 |
| 3,092,912 | 6/1963 | Reed | 33—125 X |

FOREIGN PATENTS

| | | |
|---|---|---|
| 152,450 | 3/1962 | U.S.S.R. |
| 618,774 | 9/1935 | Germany. |
| 1,132,614 | 11/1956 | France. |

ROBERT B. HULL, *Primary Examiner.*